(12) United States Patent  
Altakrouri

(10) Patent No.: US 12,518,336 B2  
(45) Date of Patent: Jan. 6, 2026

(54) ADAPTIVE PERCEPTIBLE WATERMARKING

(71) Applicant: Saudi Arabian Oil Company, Dhahran (SA)

(72) Inventor: Bashar Altakrouri, Dhahran (SA)

(73) Assignee: Saudi Arabian Oil Company, Dhahran (SA)

(\*) Notice: Subject to any disclaimer, the term of this patent is extended or adjusted under 35 U.S.C. 154(b) by 371 days.

(21) Appl. No.: 18/177,495

(22) Filed: Mar. 2, 2023

(65) Prior Publication Data

US 2024/0296516 A1  Sep. 5, 2024

(51) Int. Cl.
| | |
|---|---|
| *G06T 1/00* | (2006.01) |
| *G06F 3/01* | (2006.01) |
| *G06T 3/40* | (2024.01) |

(52) U.S. Cl.
CPC ............ *G06T 1/0028* (2013.01); *G06F 3/012* (2013.01); *G06F 3/013* (2013.01); *G06T 3/40* (2013.01)

(58) Field of Classification Search
CPC ....... G06T 1/0028; G06T 3/40; G06T 1/0021; G06T 11/00; G06T 11/60; G06T 2201/0051; G06F 3/012; G06F 3/013
See application file for complete search history.

(56) References Cited

U.S. PATENT DOCUMENTS

| | | | |
|---|---|---|---|
| 8,345,316 B2 | 1/2013 | Bradley et al. | |
| 9,454,790 B2 | 9/2016 | Kim et al. | |
| 9,996,150 B2 * | 6/2018 | Swaminathan | G06V 20/20 |
| 11,403,373 B2 | 8/2022 | Fleck et al. | |
| 2006/0140441 A1 | 6/2006 | Miller et al. | |
| 2014/0013437 A1 * | 1/2014 | Anderson | G06F 21/60 |
| | | | 726/26 |
| 2014/0168056 A1 | 6/2014 | Swaminathan et al. | |

FOREIGN PATENT DOCUMENTS

| | | |
|---|---|---|
| CA | 2276378 | 2/2003 |
| WO | WO 2022066159 | 3/2022 |

OTHER PUBLICATIONS

Brudy et al., "Is anyone looking? Mitigating shoulder surfing on public displays through awareness and protection," Proceedings of the International Symposium on Pervasive Displays, Jun. 2014, 6 pages.

International Search Report and Written Opinion in International Appln No. PCT/US2024/017477, dated Jun. 27, 2024, 16 pages.

* cited by examiner

*Primary Examiner* — Christopher Wait  
(74) *Attorney, Agent, or Firm* — Fish & Richardson P.C.

(57) ABSTRACT

This disclosure describes systems and methods for unobtrusively and adaptively displaying a watermark on a display screen based on context sensing and behavior analytics. The techniques can include receiving from a sensor of a user device, information about a focus of attention of a user viewing a display screen of the computing device; determining a placement of a perceptible watermark for displaying onto the display screen based, at least in part, on the focus of attention of the user; causing media content to be displayed on the display screen; and causing the watermark to be displayed on the display screen in a position on the display screen based on the focus of attention of the user.

20 Claims, 7 Drawing Sheets

ADAPTIVE PERCEPTIBLE WATERMARKING

FIELD

This disclosure pertains to adaptive perceptible watermarking, and more particularly, to unobtrusive and adaptive perceptible digital watermarking based on context sensing and behavioral analytics.

BACKGROUND

Media content is susceptible to copying or piracy. Watermarking has been developed to help protect ownership rights of media. A watermark is a logo, text, or pattern that is intentionally superimposed onto another image. The purpose of the watermark is to make it more difficult for the original image to be copied or used without permission.

SUMMARY

The present disclosure describes techniques that can be used for adaptively displaying an unobtrusive watermark on displayed digital content using context sensing and behavioral analytics. In some implementations, a computer-implemented method includes the following: receiving from a sensor of a user device, information about a focus of attention of a user viewing a display screen of the computing device; determining a placement of a perceptible watermark for displaying onto the display screen based, at least in part, on the focus of attention of the user; causing media content to be displayed on the display screen; and causing the watermark to be displayed on the display screen in a position on the display screen based on the focus of attention of the user.

Aspects of the embodiments are directed to a system that can include a communications system to send media content and watermarking to a user device across a network; and a server comprising a hardware processor and a non-transitory computer-readable storage media storing instructions that, when executed, cause the hardware processor to perform operations. The operations can include receiving, from a sensor of a user device, information about a focus of attention of a user viewing a display screen of the computing device; determining a placement of a perceptible watermark for displaying onto the display screen based, at least in part, on the focus of attention of the user; causing media content to be displayed on the display screen; and causing the watermark to be displayed on the display screen in a position on the display screen based on the focus of attention of the user.

Aspects of the embodiments can also include a user device that includes: display device to provide imagery to a user; a sensor to sense characteristics of the user for ascertaining a focus of attention of the user; a hardware processor; and a non-transitory computer-readable storage medium storing instructions that when executed, cause the hardware processor to perform operations. The operations can include receiving, from the sensor, information about a focus of attention of a user viewing the display device of the computing device; determining a placement of a perceptible watermark for displaying onto the display device based, at least in part, on the focus of attention of the user; causing media content to be displayed on the display device; and causing the watermark to be displayed on the display device in a position on the display device based on the focus of attention of the user and based on the media content.

Some embodiments can include determining a type of application running on the computing device; and determining the placement of the perceptible watermark for displaying onto the display screen based, at least in part, on the type of application running.

Some embodiments can include determining a type of media content being viewed by the user on the display; and determining the placement of the perceptible watermark for displaying onto the display screen based, at least in part, on the type of media content.

Some embodiments can include determining that the media content being viewed is confidential; and causing the watermark to be displayed on the display screen based on the determination that the content being viewed is confidential.

Some embodiments can include determining that a second user is viewing the display screen; and causing the watermark to be displayed on the display screen based on the determination that the second user is viewing the display screen.

In some embodiments, determining the focus of attention of the user includes determining one or more of eye gaze, head movements, and body posture of the user from the sensor.

In some embodiments, determining the focus of attention of the user includes determining an interaction with an application running on the computing device.

Some embodiments can include determining that the focus of attention of the user has changed; changing the display of the watermark on the display screen based on the determination that the focus of attention of the user has changed; and causing the watermark to be displayed on the display screen based on the change.

In some embodiments, changing the display of the watermark comprises one or more of changing a location on the display screen of the watermark and changing a perceptibility of the watermark.

In some embodiments, the perceptibility of the watermark comprises one or more of a size, font, number, and transparency of the watermark.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. For example, among the advantages that apparent to those of skill in the art, the present disclosure provides for digital media content protection through perceptible watermarking, but does so in an unobtrusive matter. A viewer can view the media content without the watermark obscuring the viewing experience. Aspects of the disclosure can be applicable to virtual reality, augmented reality, and perceptible use cases. Notably, with the adoption of online realities, such as the metaverse and other online realities, where the traditional physical boundaries that are considered a layer of protection for the digital content disappear in favor of virtual presence that allow easier potential for information leaks.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

BRIEF DESCRIPTION OF THE DRAWINGS

Like reference numbers and designations in the various drawings indicate like elements. Drawings are not to scale.

DETAILED DESCRIPTION

Figure 1:
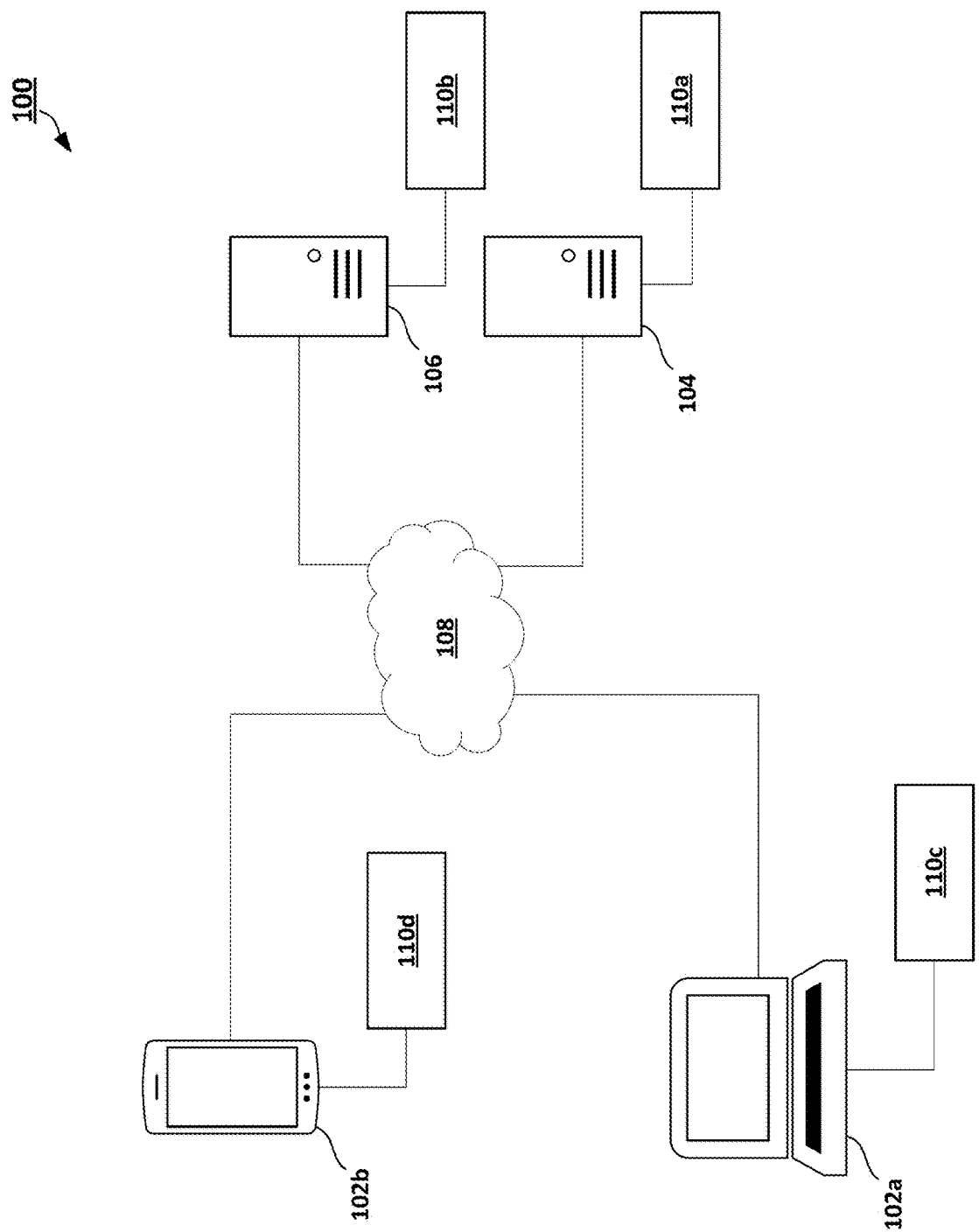
FIG. 1 is a schematic diagram of a system for providing unobtrusive and adaptive perceptible watermarking in accordance with embodiments of the present disclosure.

The following detailed description describes techniques for adaptively displaying an unobtrusive watermark on displayed digital content using context sensing and behavioral analytics. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The disclosure describes systems and methods for displaying perceptible digital watermarking. Specifically, this disclosure relates to the dynamic overlay, insertion, or placement (i.e., display) of watermarks on digital content displayed on a screen. Unobtrusive and perceptible watermarking is adaptively displayed by combining user context sensing, behavioral analytics, and environmental context. By taking into account the user's surroundings, the adaptive perceptible watermarking described herein can allow a user to have an immersive interaction or experience with digital media while also preserving the perceptibility of the watermarks for copyright protection and enforcement. The techniques described herein can be effectively applied to both physical setup (computer, mobile devices, etc.) as well as the virtual or augmented setup.

The adaptive perceptible watermarking dynamically adjusts the watermarks placement and appearance based on the user's dynamic internal and external context, including the user's focus of attention, sight lines, task in-hand, surrounding people, etc. The adjustments can be optimized through multiple strategies, such as reducing density of watermarks, reducing watermark perceptivity (i.e., opacity, number, font, size, etc.), displaying imperceptible watermarks for certain parts of the screen while increasing watermark perceptivity in other parts of the screen, removing watermarks for certain part the screen. The focal attention of the user and the user's user context are detected through various ways, including gaze analysis, input medium, executed action (scrolling, tapping, etc.), user posture, device position, and device orientation (e.g., for handheld devices).

Onscreen perceptible watermarking is a technique to secure digital content, such as documents or images, by overlaying (i.e., showing) watermarks on top a displayed digital content. Ultimately, this technique aims is to visually alert the content consumer (i.e., user) on the importance and ownership of the content. Additionally, it hinders any unauthorized use and distribution of the presented content. Despite its usefulness, perceptible watermarking reduces the quality of the displayed content, obstructs the user's field of sight, reduces documents' readability, and negatively impacts the aesthetics of visual content. This leads to either a compromised user experience or to a completely disengaged user.

FIG. 1 is a schematic diagram of a system 100 for providing unobtrusive and adaptive perceptible watermarking in accordance with embodiments of the present disclosure. System 100 includes a user device, such as user device 102a and/or user device 102b. User device 102a can be a personal computer, laptop, workstation, or other computing device. User device 102a can communicate with a media content server 104 across a network 108 through a wired or wireless connection. User device 102b can be a mobile device, such as a smartphone, tablet, or other type of mobile computing and communications device. User device 102b can communicate with media content server 104 through network 108. User device 102a or 102b can implement computing functionality similar to that discussed with FIG. 7.

Media content server 104 can include a server that hosts media content for viewing or interacting by a user operating a user device. The media content server 104 can implement a watermark adjustment algorithm 110a for displaying a watermark onto the user device while the user is viewing or otherwise interacting with certain digital media. In embodiments, a separate service supported by watermarking server 106 can implement the watermarking algorithms 110b for adaptively displaying the watermarks onto the user device. By way of example, the following uses the media content server 104 implements the watermarking adjustment algorithm 110a, with the understanding that a different server can also implement the watermarking algorithm 110b and overlay watermarks onto media content provided by the media content server 104.

The user device (e.g., user device 102a or 102b) can communicate context information to the media content server 104 (e.g., via network 108). For example, the user device can communicate user image information, mouse position or movement information, location information (e.g., from GPS or cellular location data), and other types of context information. The user device can include a camera that can view the user's gaze and head and body orientation for determining what the user is looking at. The camera can also be used to determine whether other people are in the vicinity and that are looking at the monitor displaying the media content. The user device can also include a user interface device (e.g., mouse, keyboard, touch screen, monitor, etc.), and other types of user interfaces. The user device can also communicate the application that is running, the content that is being viewed, and other information that the media content server 104 can used for dynamically displaying perceptible watermarks. Camera and input information can be sent to the media content server 104. The media content server 104 can apply the adaptable perceptible watermarking algorithm 110*a* to adjust the placement, number, and/or appearance of watermarks being displayed on the user device screen. The media content server 104 (or as stated before, the watermark server 106) can dynamically display watermarks onto the screen of the user device while the screen also displays the media content. The watermarks can be digitally overlaid in streaming media content, for example.

In embodiments, user device can include a perceptible watermarking algorithm (e.g., user device 102*a* can include a watermarking algorithm 110*c*; user device 102*b* can include a watermarking algorithm 110*d*). The user device can include a secure application or service that generates and overlays the watermarks onto a display screen of the user device and without communicating with the server 104 or 106. In such implementations, the watermarking can be applied in offline scenarios.

FIGS. 2A-D are schematic diagrams of example adaptive perceptible watermarking use-cases in accordance with embodiments of the present disclosure. FIGS. 2A-D illustrate different example scenarios 200*a-d* to utilize the adaptive watermarking in a use case where a single user is using the user device 202. In each of FIGS. 2A-2D, a user 210 is using a computing device (such as user device 102*a*) that has a monitor 202. Monitor 202 includes a display screen 204 for displaying media content 206. The user 210 can gaze at certain parts of the screen 204, as shown by gaze 212.

Figure 2:
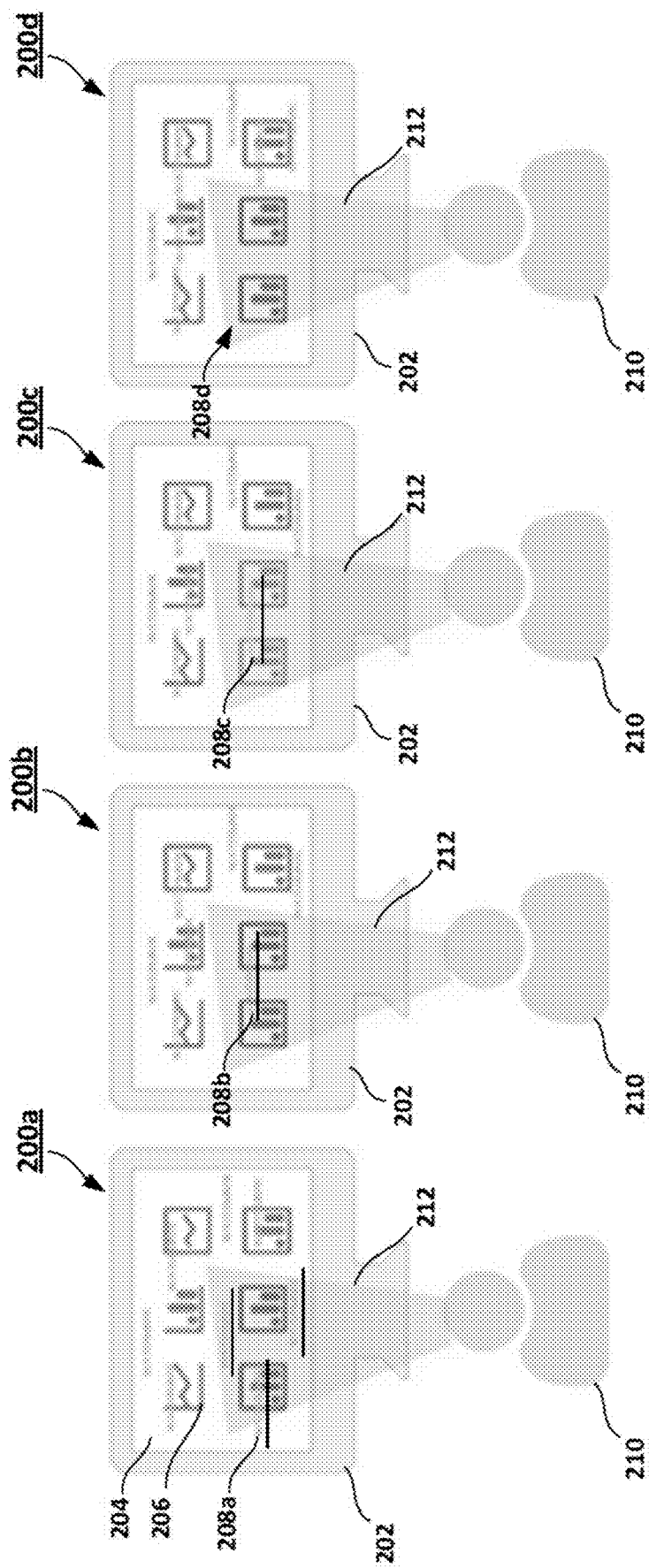
FIGS. 2A-D are schematic diagrams of example adaptive perceptible watermarking use-cases in accordance with embodiments of the present disclosure.

FIG. 2A is a schematic diagram 200*a* that illustrates the perceptible watermarking without applying adaptability. The watermarks 208*a* (shown as underlined) within the user's gaze 212 are displayed in a manner that does not apply adaptability, and are shown regardless of the user's context and actions. As shown in FIG. 2A, three watermarks 208*a* (underlined) are shown within user's gaze 212. The watermarks are displayed without perceptibility alternation. The term "perceptible" generally refers to watermarks that can be perceived or seen by the user or users. Such perceptible watermarks can include a digital watermark that is dynamically embedded into the content or user application, watermarks that are overlaid onto the application the user is running to view content, and/or on-screen watermarks that are displayed on a screen.

FIG. 2B is a schematic diagram 200*b* that illustrates a reduction of the number (or density) of watermarks 208*b* within the user's gaze for an improved user experience and less obtrusiveness. As shown in FIG. 2B, one watermark 208*b* (underlined) is displayed on the screen within the user's gaze 212. The watermark 208*b* is shown to obscure the media content being viewed by the user 210. In embodiments, the placement of the watermark 208*b* can be lower or higher within the user's gaze 212 but without obscuring the media content. FIG. 2C is a schematic diagrams 200*c* that illustrates the change in the opacity of the watermark 208*c* (underlined) within the user's gaze 212. The opacity (i.e., transparency) of the watermark 208*c* can be changed so that the watermark is still perceptible but does not overly obscure the media content. FIG. 2D is a schematic diagram 200*d* that depicts the removal of the watermarks from the user's gaze 212. The removal of watermarks (shown as 208*d*) can allow the media content to be viewed without being obscured. In some embodiments, the watermarks that are remaining perceptible can be increased in number or perceptibility so they are more prominently displayed outside of the user's gaze 212.

The number and perceptibility of the watermarks can be based on various factors. For example, the owner of the media content can remove all watermarks from the user's gaze but can increase the number or perceptibility of watermarks surrounding the user's gaze. The owner of the media content can base the adaptability of the watermarks based on what the user if viewing, the importance of the media content, the type of media content, etc.

FIGS. 3A-D are schematic diagrams of example adaptive perceptible watermarking for social settings use-cases in accordance with embodiments of the present disclosure. In the social settings use-cases, a primary user 310*a* can use a computing device (such as user device 102*a* or 102*b*) but in a setting where another person (observer 310*b*) or other people may be able to observe the media content. The user's gaze 312*a* can be tracked and used to dynamically display watermarks (as described in the text accompanying FIGS. 2A-D). The observer's gaze 312*b* can also be tracked to ensure that watermarks are displayed within the observer's gaze 312*b* when the observer 310*b* deliberately or inadvertently views the media content on the screen.

Figure 3:
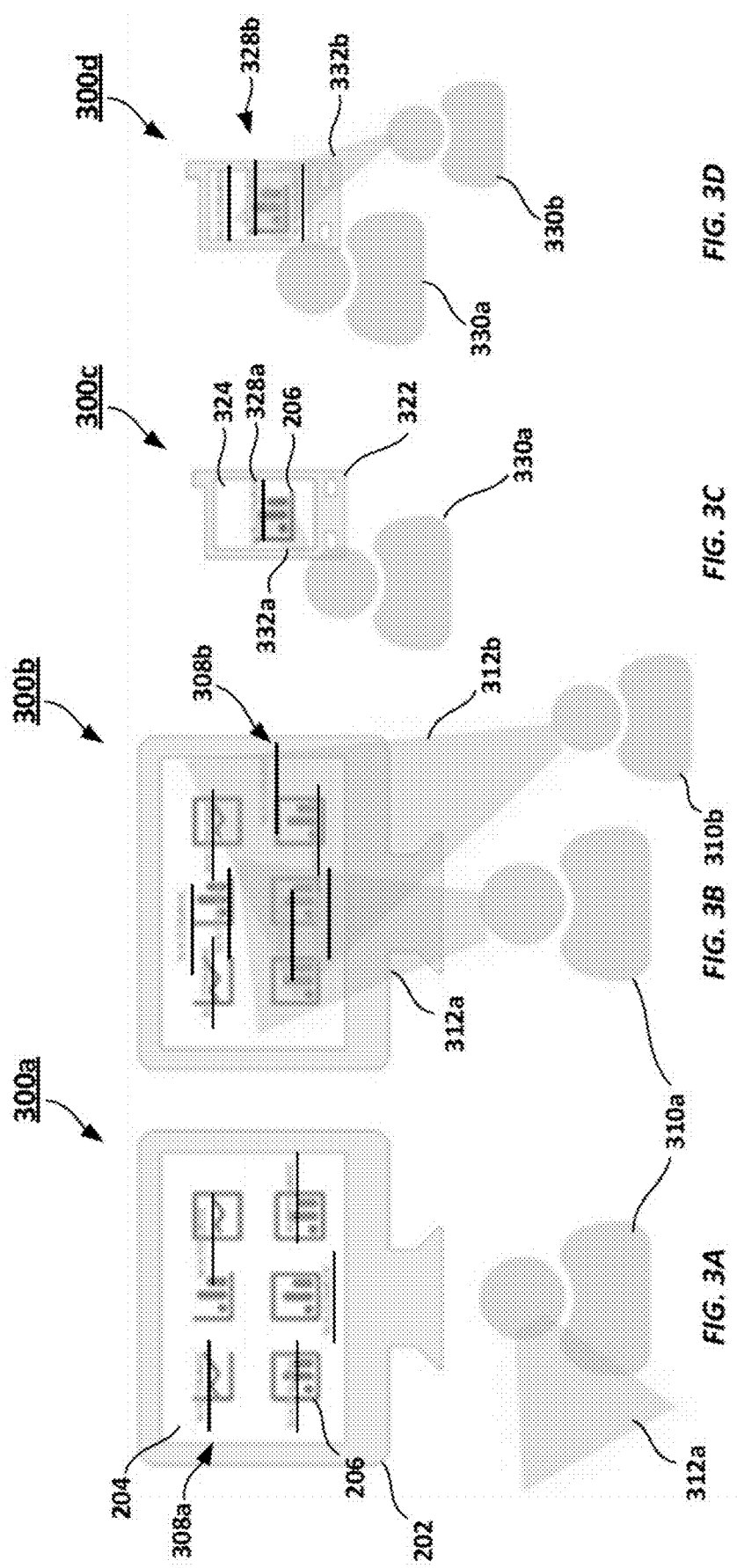
FIGS. 3A-D are schematic diagrams of example adaptive perceptible watermarking for social settings use-cases in accordance with embodiments of the present disclosure.

FIG. 3A is a schematic diagram 300*a* that illustrates perceptible onscreen watermarking displayed on the screen 204 as the user is looking away (show by gaze 312*a*). In this scenario, watermarks 308*a* (underlined) do not interfere with the user's current activity, hence showing the watermarks 308*a* with full intensity protects the content and does not interrupt the user's experience. As shown by example in FIG. 3A, five watermarks are shown. FIG. 3B is a schematic diagram 300*b* that illustrates the increase of the intensity and/or number (eight watermarks are shown) of watermarks 308*b* (underlined) due to the proximity of another person, observer 310*b*. The increase in intensity and/or number of watermarks 308*b* increases the protection the content from shoulder surfing.

FIG. 3C is a schematic diagram 300*c* that illustrates the display of watermark 328*a* (underlined) on a mobile device 322. Mobile device 322 can include a display screen 324 that can display media content 206 and watermark 328*a*. The user 330*a* can gaze at the screen, shown by user gaze 332*a*. The mobile device 322 only detects the user's gaze 332*a*, so the adaptive watermark algorithm 110*a* can reduce the number of watermarks 328*a* (one watermark, underlined) and can reduce the intensity of the watermark 328*a* for the mobile individual user 330*a* due to the mobility nature of the user, relatively small screen size, and awareness to the surroundings. FIG. 3D is a schematic diagram 300*d* that shows the increase of the intensity and/or number (three) of watermarks 328*b* (underlined) on a mobile device 322 of a user 330 as another person 330*b* comes into close proximity. The gaze 332*b* of the other person 330*b* can also be tracked to dynamically adjust the placement and/or perceptibility of the watermarks.

Figure 4:
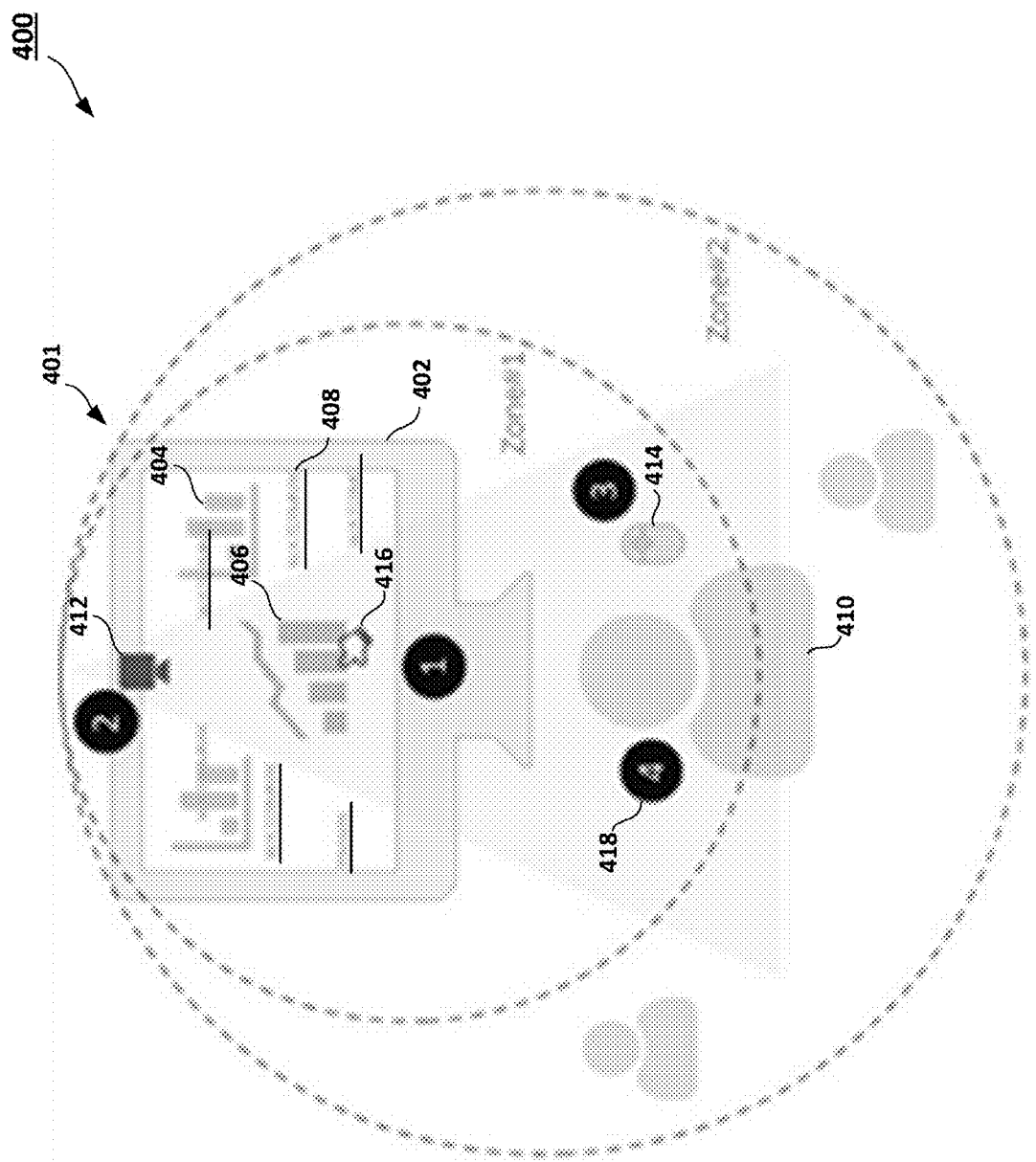
FIG. 4 is a schematic diagram of an example of inputs that can be used for context sensing and behavior analytics for adaptively displaying perceptible watermarking in accordance with embodiments of the present disclosure.

FIG. 4 is a schematic diagram 400 of an example of inputs that can be used for context sensing and behavior analytics for adaptively displaying perceptible watermarking in accordance with embodiments of the present disclosure. FIG. 4 illustrates how an unobtrusive and adaptive watermarking can be realized on a screen 402 of a computer device 401. The screen 402 can display media content 404. In particular, the screen 402 can display specific media of interest 406 at the center of the screen 402. Watermarks 408 (underlined) can also be displayed on the screen 402. The computing device 401 can include an input device 416, which is a mouse in this example. In addition, the computing device 401 includes an imaging device 412 that can perform gaze tracking.

In (1) the adaptive watermarking algorithm 110a can monitor the current activity (i.e., task) that the user executes. For example, the type of application that is currently in use, the type of displayed information, the confidentiality of the information, etc. can be determined or monitored by the adaptive watermarking algorithm 110a. In (2) the adaptive watermarking algorithm 110a uses imager 412, which can include gaze and head movement sensors, video cameras, webcams, eye gaze tracking sensors, etc., can be used as well, to detect the users focus of attention. For example, the adaptive watermarking algorithm 110a can use gaze and head movement information to determine whether the user is looking at the digital content, where is the user's focus of attention is located. In the example shown in FIG. 4, the user can be looking at the media content 406 as determined by the imager 412. The adaptive watermarking algorithm 110a can remove watermarks 408 from the area on the screen that includes the media content that the user is viewing.

In (3) the adaptive watermarking algorithm 110a utilizes any other in-use input device (e.g., mouse 414, keyboard, etc.) to identify the interaction behavior of the user. For example, the mouse 414 has moved the mouse arrow 416 proximate to media content 406. The adaptive watermarking algorithm 110a can monitor this user to adjust the placement of watermarks near the media content that corresponds to the mouse arrow location. In (4) the adaptive watermarking algorithm 110a uses any wearable devices on user has to identify the user's posture to infer the user's focus of attention.

All the above information from (1)-(4) is fused together to identify the user's focus of attention to the digital content within the use's personal zone (depicted as Zone 1 in FIG. 4). This information is then used as input to generate dynamic and unobtrusive watermarks. The behavioral (e.g., contextual and interaction information) of the user can be converted into context vectors. Each vector encodes different information such as context information, weight (i.e., relevance to the watermarking process), and confidence (i.e., detection confidence). Some or all of the vectors are then input into a fusion algorithm to score, combine, and map the vectors to identify the users focus of attention.

Figure 5:
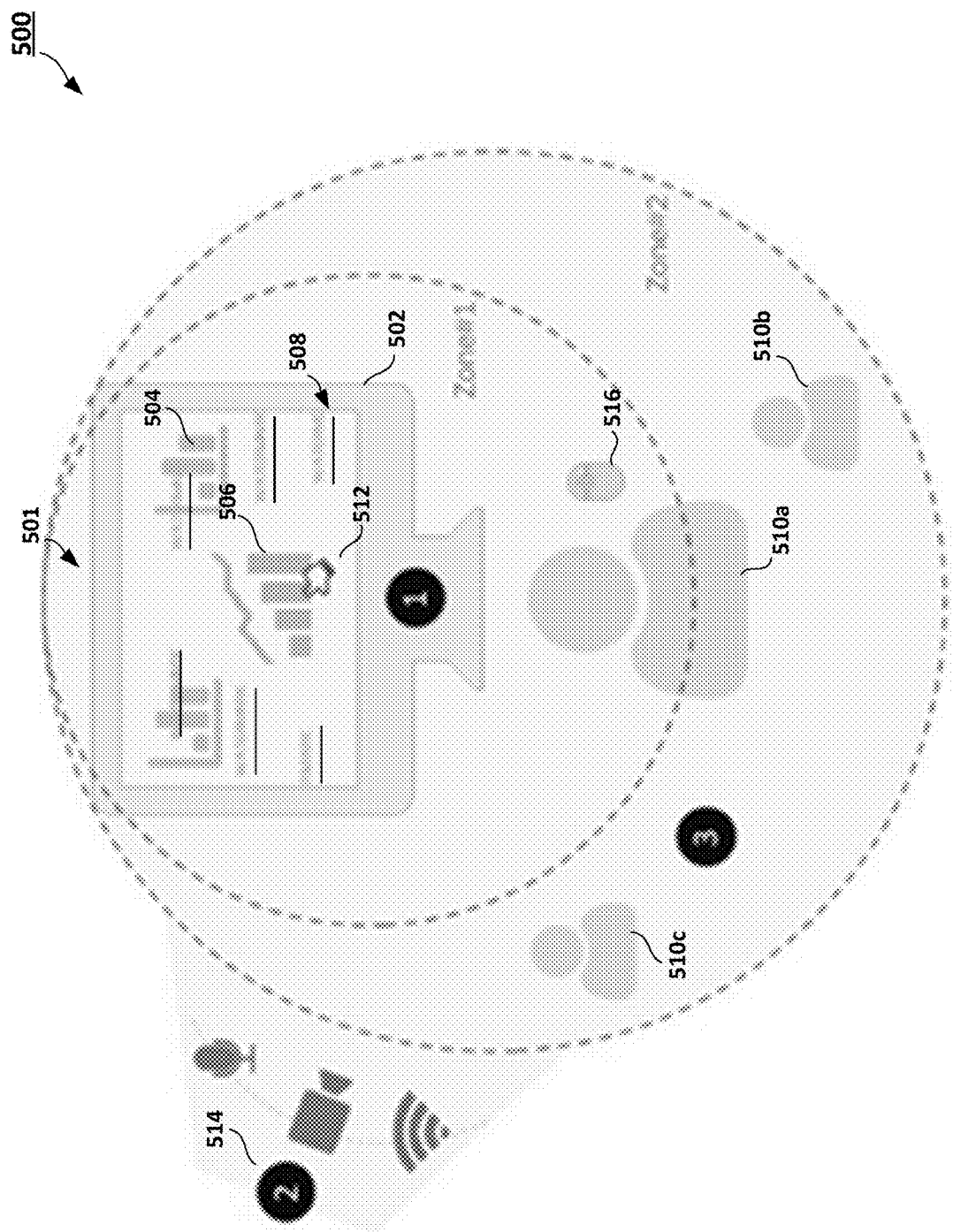
FIG. 5 is a schematic diagram of an example of inputs that can be used for context sensing and behavior analytics for adaptively displaying perceptible watermarking in social setting use-cases in accordance with embodiments of the present disclosure.

FIG. 5 is a schematic diagram 500 of an example of inputs that can be used for context sensing and behavior analytics for adaptively displaying perceptible watermarking in social setting use-cases in accordance with embodiments of the present disclosure. FIG. 5 illustrates how perceptible watermarking can be adaptively placed perceptible in shared, social, public, or otherwise non-private settings. In FIG. 5, a user 510a can operate a user device 501, which can be a computing device or mobile device—in this case, the user 510a is operating the user device 501 in a shared setting, where other users 510b and 510c are in the proximity of the user 510a. The user device 501 can include a screen 502 that can display media content 504 and 506. The user 510a can view media content 506, which is more prominently displayed on the screen 502. Watermarks 508 can be displayed perceptible in a manner that does not encumber viewing of media content 506 but is still perceptible to both the user 510a and other people 510b and 510c that may look on.

The adaptive watermarking algorithm 110a can use various sources of information to adaptively display perceptible watermarks 508. In (1) the adaptive watermarking algorithm 110a monitors the current task that the user executes (e.g., the type of application is currently in use, the type of displayed information, the confidentiality of the information, etc.). The adaptive watermarking algorithm 110a can monitor the type of application that is running, the particular content that is being viewed, the user's interaction with the content or application (e.g., mouse clicks, keyboard entries, stylus contacts, touch-screen contacts, etc.). The adaptive watermarking algorithm 110a does this monitoring, even in social settings, so that the adaptive watermarking algorithm 110a can place watermarks perceptible but unobtrusively. In (2) the adaptive watermarking algorithm 110a uses sensors 514 to detect the user's social context and her proximity to others. Sensors 514 can include motion detection sensors, video cameras, webcams, personal devices proximity (such as Bluetooth and Wi-Fi), and audio input (e.g., microphone). The sensors 514 should cover the social zone of the user (Zone 2) as depicted in (3) and possible unintended exposure of the digital content to the surrounding people 510b and 510c. The information collected by the adaptive watermarking algorithm 110a is used to generate dynamic and unobtrusive watermarks. Here, the watermarks can be unobtrusively displayed so that the user 510a can view the media content 506, while watermarks 508 (underlined) are perceptively displayed so that other people 510b and 510c will see the watermarks. The placement of the watermarks 508 can be adaptive to adjust for changing environment. For example, as fewer people are proximate the user 510a, the watermarks 508 can be less perceptible; as more people are proximate the user 510, the watermarks 508 can become more perceptible.

It is appreciated that one purpose of media content is to attract viewers. Thus, the adaptive watermarking algorithm 110a recognizes that on-lookers should still be able to recognize the quality and value of the media content while also including watermarking to protect ownership rights. Going one step further, the media content owner may want on-lookers to see both the media content and the name of the company, so that the on-looker associates the quality media content with the company. Thus, the adaptability of watermarking can serve a multiple purposes at the same time: the placement of perceptible watermarking can allow the primary user to view the content unobtrusively; the placement and perceptibility of the perceptible watermarking can protect ownership rights and copyright enforceability of the media content; and the watermarking placement and perceptibility can be used for advertising purposes.

Figure 6:
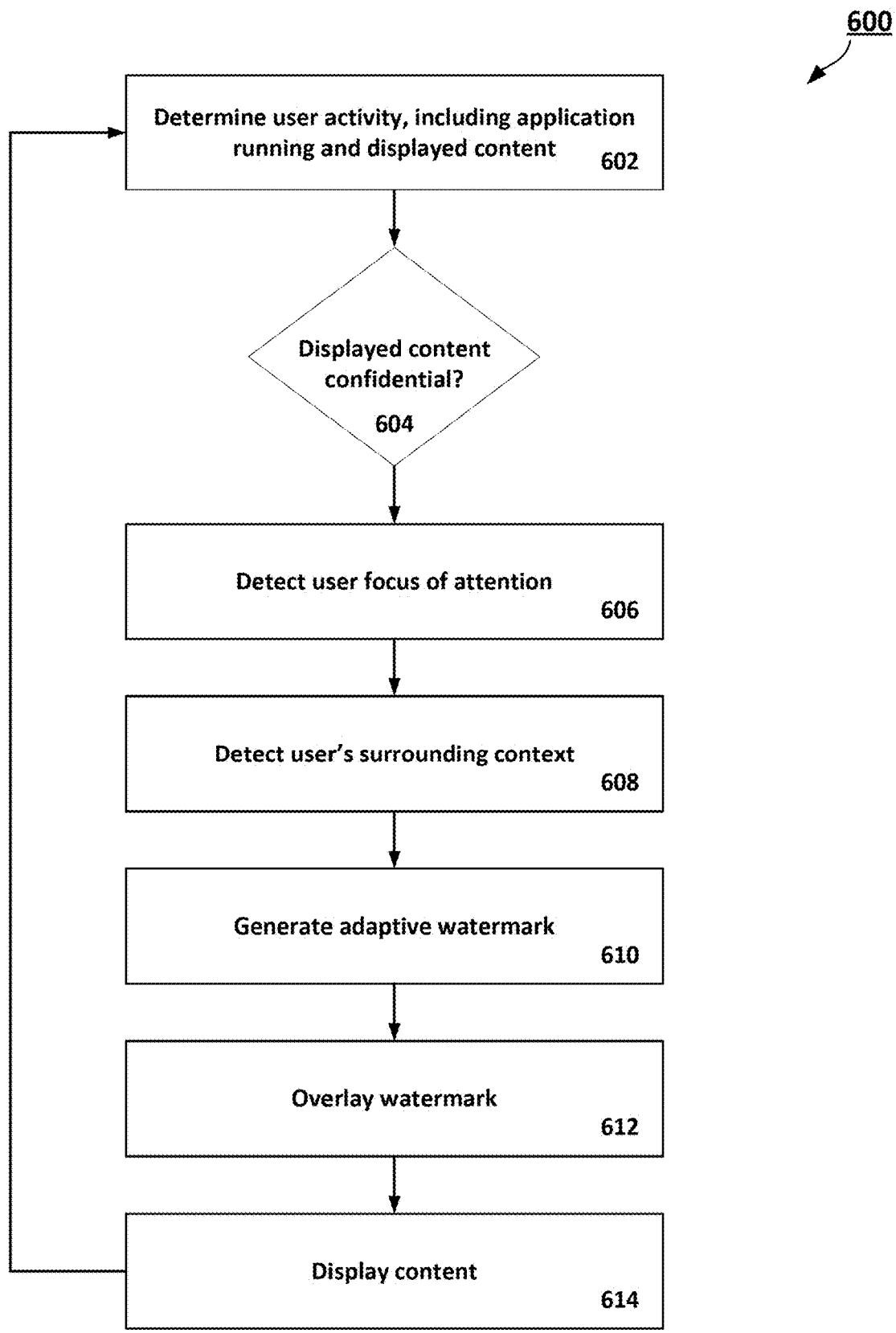
FIG. 6 is a process flow diagram for adaptively displaying perceptible watermarking in accordance with embodiments of the present disclosure.

FIG. 6 is a process flow diagram 600 for adaptively displaying perceptible watermarking in accordance with embodiments of the present disclosure. The process described in FIG. 6 can be performed by a server in communication with a user device; or it can be performed by a software application or service securely running on the user device itself. The generation of the unobtrusive and adaptive perceptible onscreen watermarking is depicted by the process flow 600 of FIG. 6. In step (602), the user's current activities such as the current running applications and the displayed content are determined by the adaptive watermarking algorithm 110a. For example, the adaptive watermarking algorithm 110a can determine the program the user is running to view the media content. For example, the program that the user is using can have a layout that is taken into account, where certain parts of the screen include non-viewable areas for toolbars or other utilities. These areas are not suited for placing a watermark. The program may also have an API for interfacing with the algorithm, so that digital overlaying can occur within the program itself, as opposed to on an overlay program. The use of virtual reality or augmented reality can also be determined, in order to dynamically place watermarks perceptible. This placement is of particularly importance because the viewer's field of view is already limited, and watermarking can be particularly obtrusive in virtual or augmented applications.

The specific media content the user is viewing can be determined. For example, what specifically is being viewed can be used to determined how to place watermarks. The adaptive watermarking algorithm 110a can determine whether the content is segmented or continuous, if the content is streaming or still, if the content is dynamically displayed, movable, etc. All of these types of factors can be used to determine how to place perceptible watermarks and how perceptible watermarks can be moved or changed to best suit the user's experience. In the virtual realm, the size and type of the media content, and the location of the media content in relation to the user's gaze can also be used to determined where perceptible watermarks should be placed.

At step (604), the adaptive watermarking algorithm 110a can determine the confidentiality level of the displayed information and content. If the activities are categorized non-confidential, the content is simply displayed without any additional watermark, as in step (614). In the case of confidentiality, the user's focus of attention is detected as in step (606). The user focus of attention includes the location on the screen where the user is looking (e.g., using head and gaze movement); type of interaction (e.g., reading, editing, etc.); executed action (scrolling, tapping, mouse hovering, etc.); input medium (location of the pointing device or curser); user posture; and device position and orientation (only for handheld devices). In addition, the user's surrounding context as in step (608) is determined to identify the social setting and surrounding of the user. This adds level of privacy measures based on the proximity and interaction to others, especially to prevent shoulder surfing. In step (610), the watermarks are generated and configured dynamically and in an adaptive way to best guard the content with an acceptable level of obtrusiveness for a good user experience. In step (612), the watermarks are overlaid on the screen on top of the context displayed in step (614). This process is repeated indefinitely for any changes in the user's activities and context.

The commercial and practical adoption of our invention is enhanced with more adoption of multimodal natural human computer interaction technologies (e.g., wearables, gaze-based interaction, gestures, etc.) and increased adoption of the metaverse and its enabling technologies (e.g., Augmented Reality and Virtual Reality).

Figure 7:
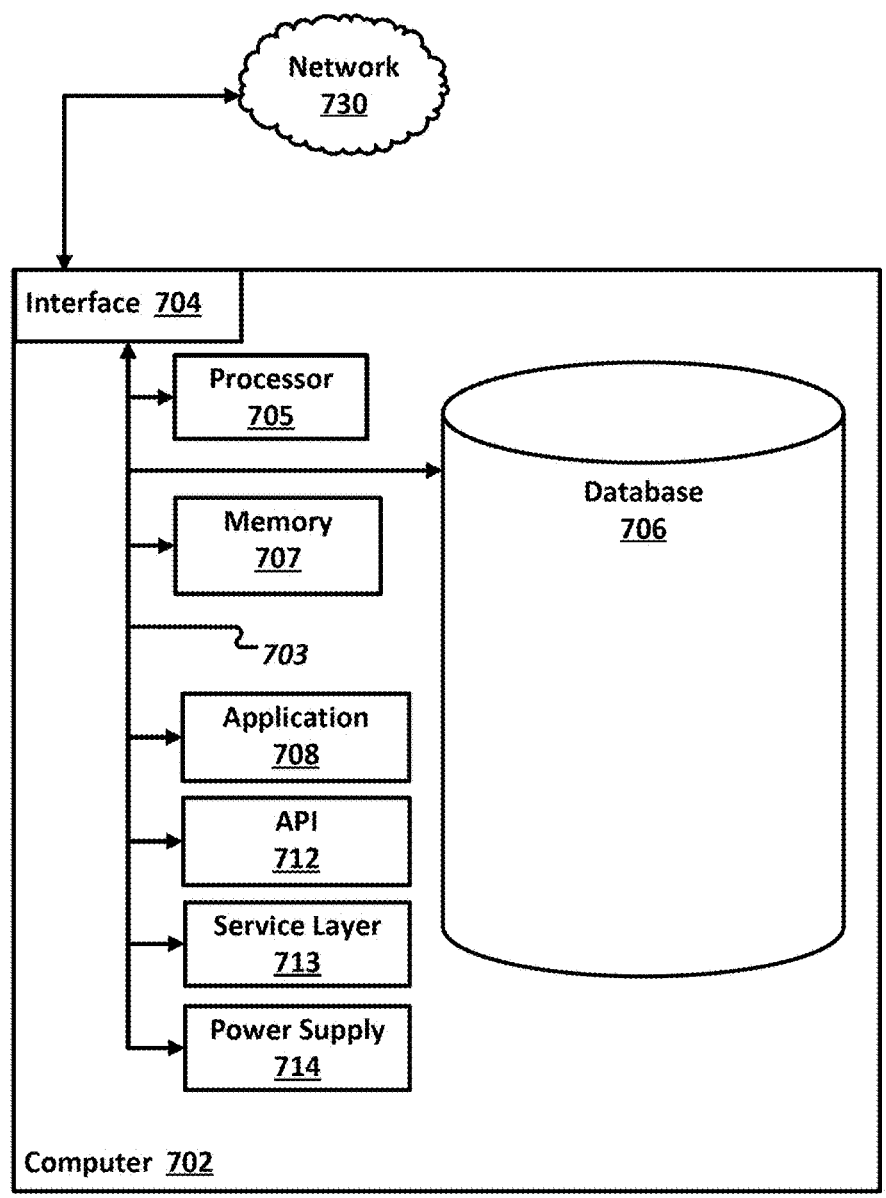
FIG. 7 is a block diagram illustrating an example computer system used to provide computational functionalities associated with described algorithms, methods, functions, processes, flows, and procedures as described in the present disclosure, according to some implementations of the present disclosure.

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a top level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both) over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A method comprising:
   receiving from a sensor of a user device, information about a focus of attention of a user viewing a display screen of a computing device;
   determining a placement of a perceptible watermark for displaying onto the display screen based, at least in part, on the focus of attention of the user;
   determining one or more visual properties of the perceptible watermark based on the focus of attention of the user and contextual data;
   causing media content to be displayed on the display screen; and
   causing the perceptible watermark to be displayed on the display screen based on the determined placement and the determined one or more visual properties.

2. The method of claim 1, further comprising:
   determining a type of application running on the computing device; and
   determining the placement of the perceptible watermark for displaying onto the display screen based, at least in part, on the type of application running.

3. The method of claim 1, further comprising:
   determining a type of media content being viewed by the user on the display screen; and
   determining the placement of the perceptible watermark for displaying onto the display screen based, at least in part, on the type of media content.

4. The method of claim 1, further comprising:
   determining that the media content being viewed is confidential; and
   causing the perceptible watermark to be displayed on the display screen based on the determination that the media content being viewed is confidential.

5. The method of claim 1, further comprising:
   determining that a second user is viewing the display screen; and
   causing the perceptible watermark to be displayed on the display screen based on the determination that the second user is viewing the display screen.

6. The method of claim 1, wherein determining the focus of attention of the user comprises determining one or more of eye gaze, head movements, and body posture of the user from the sensor.

7. The method of claim 1, wherein determining the focus of attention of the user comprises determining an interaction with an application running on the computing device.

8. The method of claim 1, further comprising:
   determining that the focus of attention of the user has changed;

changing a display of the perceptible watermark on the display screen based on the determination that the focus of attention of the user has changed; and causing the perceptible watermark to be displayed on the display screen based on the change.

9. The method of claim 8, wherein changing the display of the perceptible watermark comprises one or more of changing a location on the display screen of the perceptible watermark and changing the one or more visual properties of the perceptible watermark.

10. The method of claim 9, wherein the one or more visual properties of the perceptible watermark comprises one or more of a size, font, number, and transparency of the perceptible watermark.

11. A system comprising:
a communications system to send media content and watermarking to a user device across a network; and
a server comprising a hardware processor and a non-transitory computer-readable storage media storing instructions that, when executed, cause the hardware processor to perform operations comprising:
receiving, from a sensor of a user device, information about a focus of attention of a user viewing a display screen of a computing device;
determining a placement of a perceptible watermark for displaying onto the display screen based, at least in part, on the focus of attention of the user;
determining one or more visual properties of the perceptible watermark based on the focus of attention of the user and contextual data;
causing media content to be displayed on the display screen; and
causing the perceptible watermark to be displayed on the display screen based on the determined placement and the determined one or more visual properties.

12. The system of claim 11, the operations further comprising:
determining a type of application running on the computing device; and
determining the placement of the perceptible watermark for displaying onto the display screen based, at least in part, on the type of application running.

13. The system of claim 11, the operations further comprising:
determining a type of media content being viewed by the user on the display screen; and
determining the placement of the perceptible watermark for displaying onto the display screen based, at least in part, on the type of media content.

14. The system of claim 11, the operations further comprising:
determining that the media content being viewed is confidential; and
causing the perceptible watermark to be displayed on the display screen based on the determination that the media content being viewed is confidential.

15. The system of claim 11, the operations further comprising:
determining that a second user is viewing the display screen and interacting with digital content; and
causing the perceptible watermark to be displayed on the display screen based on the determination that the second user is viewing the display screen.

16. The system of claim 11, wherein determining the focus of attention of the user comprises determining one or more of an eye gaze, head movement, and body position of the user from the sensor.

17. The system of claim 11, wherein determining the focus of attention of the user comprises determining an interaction with an application running on the computing device.

18. The system of claim 11, the operations further comprising:
determining that the focus of attention of the user has changed; and
changing a display of the perceptible watermark on the display screen based on the determination that the focus of attention of the user has changed.

19. The system of claim 18, wherein changing the display of the perceptible watermark comprises one or more of changing a location on the display screen of the perceptible watermark and changing the one or more visual properties of the perceptible watermark; and
wherein the one or more visual properties of the perceptible watermark comprises one or more of a size, font, number, and transparency of the perceptible watermark.

20. An apparatus comprising:
a display device to provide imagery to a user;
a sensor to sense characteristics of the user for ascertaining a focus of attention of the user;
a hardware processor; and
a non-transitory computer-readable storage medium storing instructions that when executed, cause the hardware processor to perform operations comprising:
receiving, from the sensor, information about a focus of attention of a user viewing the display device of a computing device;
determining a placement of a perceptible watermark for displaying onto the display device based, at least in part, on the focus of attention of the user;
determining one or more visual properties of the perceptible watermark based on the focus of attention of the user and contextual data;
causing media content to be displayed on the display device; and
causing the perceptible watermark to be displayed on the display device based on the determined placement and the determined one or more visual properties and based on the media content.

* * * * *